United States Patent [19]
Kobayashi

[11] Patent Number: 5,395,411
[45] Date of Patent: Mar. 7, 1995

[54] FILTER FOR AIR CLEANING

[75] Inventor: Takahito Kobayashi, Ohtsu, Japan

[73] Assignee: Toyo Boseki Kabushiki Kaisha, Osaka, Japan

[21] Appl. No.: 98,843

[22] Filed: Jul. 29, 1993

[30] Foreign Application Priority Data

Jul. 31, 1992 [JP] Japan .................. 4-205491

[51] Int. Cl.⁶ .............................................. B01D 46/10
[52] U.S. Cl. .................................. 55/486; 55/527; 55/528
[58] Field of Search ........................... 55/486–488, 55/527, 528

[56] References Cited

U.S. PATENT DOCUMENTS

| | | | |
|---|---|---|---|
| 3,399,516 | 9/1968 | Hough, Jr. et al. | 55/528 X |
| 3,400,520 | 9/1968 | Sakurai | 55/528 X |
| 3,505,794 | 4/1970 | Nutter et al. | 55/528 X |
| 3,520,416 | 7/1970 | Keedwell | 55/528 X |
| 4,197,100 | 4/1980 | Hausheer | 55/528 X |
| 4,296,163 | 10/1981 | Emi et al. | 55/528 X |
| 4,324,574 | 4/1982 | Fagan | 55/527 X |
| 4,334,901 | 6/1982 | Ayes et al. | 55/527 X |
| 4,536,440 | 8/1985 | Berg | 55/528 X |
| 4,564,377 | 1/1986 | Kocatas | 55/488 |
| 4,612,237 | 9/1986 | Frankenburg | 55/528 X |
| 4,650,506 | 3/1987 | Barris et al. | 55/528 X |
| 4,728,349 | 3/1988 | Oshitari | 55/528 X |
| 4,826,519 | 5/1989 | Miyagi et al. | 55/488 X |
| 4,877,433 | 10/1989 | Oshitari | 55/528 X |
| 4,902,449 | 2/1990 | Hobbs | 55/528 X |
| 5,096,473 | 3/1992 | Sassa et al. | 55/528 X |
| 5,229,200 | 7/1993 | Sassa et al. | 55/527 X |

FOREIGN PATENT DOCUMENTS

| | | | |
|---|---|---|---|
| 4-045813 | 2/1992 | Japan | 55/486 |
| 2069368 | 8/1981 | United Kingdom | 55/487 |

Primary Examiner—Robert Spitzer
Attorney, Agent, or Firm—Leydig, Voit & Mayer, Ltd.

[57] ABSTRACT

An air cleaning filter comprising a layer (A) of water-repellent fiber and a layer (B) in which fiber bundles comprising aggregates of water-absorbent fibers are arranged. Layer (B) has an air permeability of not less than 100 cm³/cm². s and is located upstream of layer (A).

10 Claims, 8 Drawing Sheets

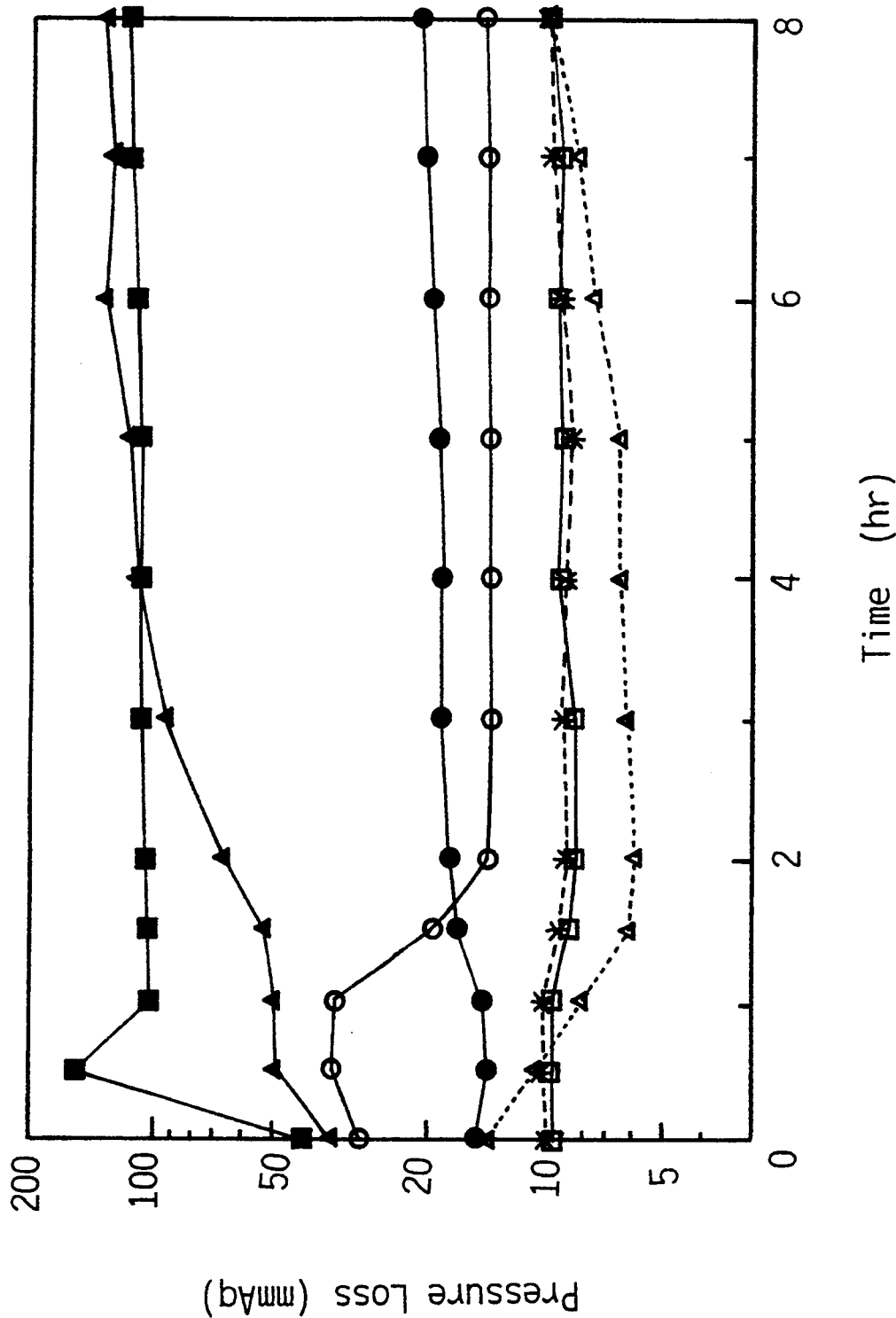

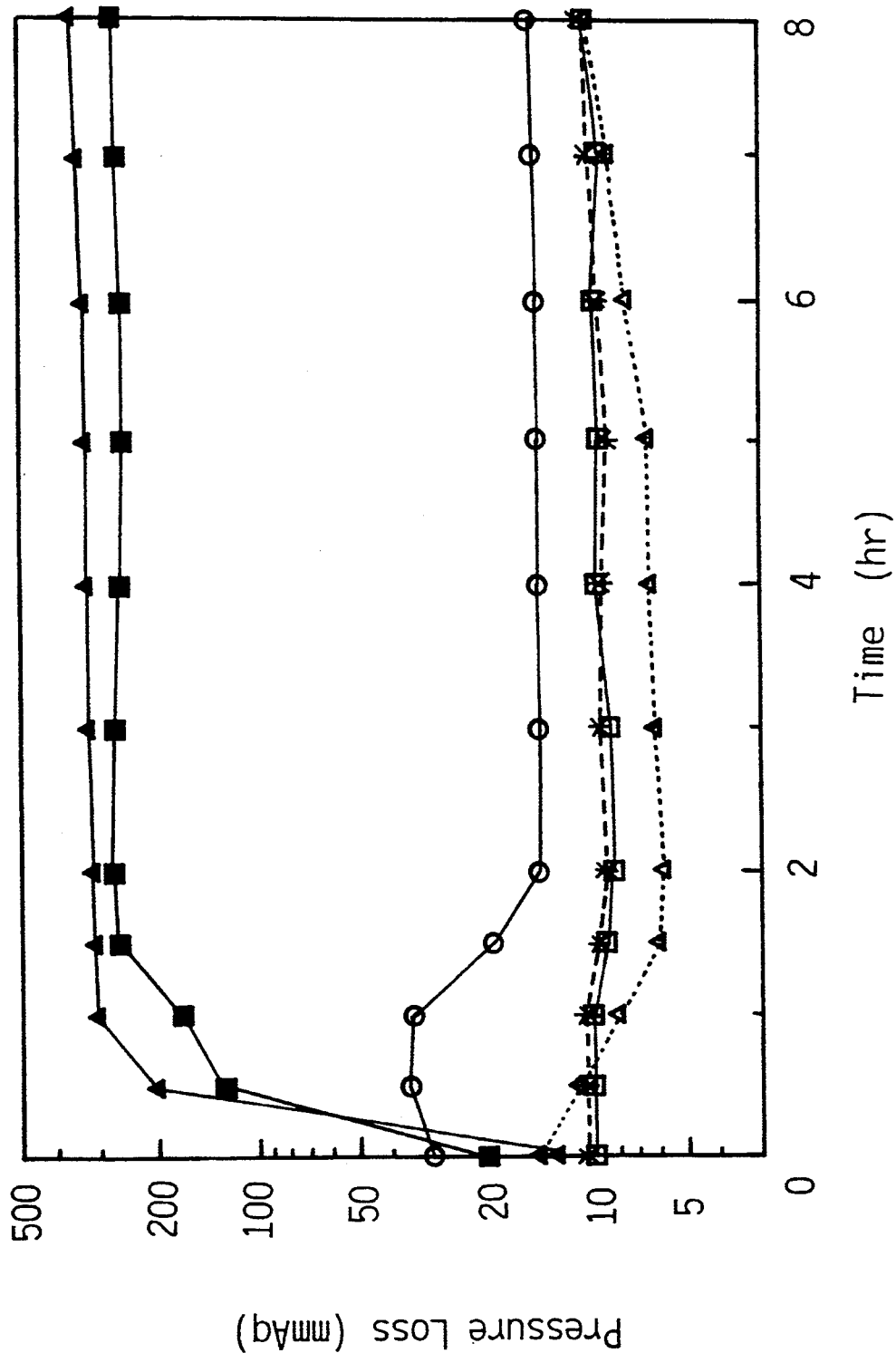

FILTER FOR AIR CLEANING

TECHNICAL FIELD OF THE INVENTION

The present invention relates to a filter for cleaning the outside air to be taken into factories, buildings, etc., and more particularly, the invention relates to an air cleaning filter for effectively removing many salt particles contained in the outside air in coastal area.

BACKGROUND OF THE INVENTION

When outside air is taken into factories, buildings, etc., it is passed through filter units with glass fiber filters (as shown in FIG. 1) being folded and housed in a frame (as shown in FIG. 2) so as to remove dust from the air. When the outside air is relatively dry, these filter units can remove salt particles which are in the state of crystalline solid particles, and other solid particles usually contained in the air. When the outside air is highly humid, however, salt particles once captured on the surface of the filter deliquesce, spread over the filter surfaces like a film, and cause a sudden increase in pressure loss. In time, the salt intrudes into factories, buildings, etc., and gives rise to salt damage. The same phenomenon occurs, too, when seawater particles from the surface of the sea are carried on and blown by a strong gale.

In recent years, there have been proposed various salt damage-preventing filters. One of those filters consists of a water-absorbent layer and a water-repellent layer, with the former located beneath or downstream of the latter (as shown in FIG. 3). This type of filter aims at preventing passage of deliquescent NaCl through the filter, first by the action of the water-repellent layer, and then by allowing the water-absorbent layer to absorb and hold the redundant NaCl that passed through the water-repellent layer. Another example has a structure wherein a space is held between two water-repellent filters (as shown in FIG. 4). With this filter unit, deliquescent NaCl is repelled first by a water-repellent filter located upstream, and then by a water-repellent filter located downstream when NaCl has passed through the upstream filter.

However, when filters are placed horizontally, the deliquescent NaCl liquid droplets stay on the filter surfaces for a long time and decrease the area usable for ventilation, thus increasing pressure loss. Even if the filters are used in the direction of gravitation, the deliquescent NaCl spreads on the surface of the upstream filter like a film and leads to an inceased pressure loss, promoted by the fact that water-absorbent particles other than NaCl adhere to the surface of the upstream filter in practical use. Such increase in the pressure loss induces passage of the deliquescent NaCl through the upstream layer onto the downstream layer.

When an upstream filter has water-repellency, the salt liquidized by deliquescing phenomenon, which passed through the upstream filter never returns to the upstream filter.

In the case of the filter as shown in FIG. 3, an increase in pressure loss for the reasons described above forces NaCl to be pushed out from an upstream filter toward a downstream water-absorbent layer and it is absorbed and retained there by said layer; in a long-time operation, however, scattering of the NaCl from the water-absorbent layer occurs.

In the case of the filter as shown in FIG. 4, the peculiar structure having two water-repellent layers does not satisfactorily prevent scattering of NaCl when used for a long time, since the same phenomenon as described above occurs.

Accordingly, an object of the present invention is to provide an air cleaning filter which does not show great increase in pressure loss even when the outside air is highly humid and the salt particles gathered on the filter surfaces deliquesce, and which in turn is free of passing of the deliquescent salt toward and out from a downstream filter.

SUMMARY OF THE INVENTION

The present invention provides an air cleaning filter comprising:
(A) a layer of water-repellent fiber and
(B) a layer in which fiber bundles composed of aggregates of water-absorbent fibers are arranged, said layer (B) having an air permeability of not less than 100 cm$^3$/cm$^2$. s (according to JIS-L-1096 "Testing Methods for Woven Fabrics" 6.27.1, A method), and said layer (B) being located upstream of said layer (A).

The use of the filter of the invention results in-resolving the above-mentioned problems.

BRIEF DESCRIPTION OF THE DRAWINGS

FIG. 8 shows the relationship between the elapsed time after ventilation and the pressure loss, wherein  shows the results of the filter of Exp. 1,  shows the results of the filter of Exp. 2,  shows the results of the filter of Exp. 3, * shows the results of the filter of Exp. 4,  shows the results of the filter of Com. Exp. 1,  shows the results of the filter of Com. Exp. 2, and  shows the results of the filter of Com. Exp. 3;

FIG. 9 shows the relationship between the elapsed time after ventilation and the pressure loss, wherein  shows the results of the filter of Exp. 1,  shows the results of the filter of Exp. 2,  shows the results of the filter of Exp. 3, * shows the results of the filter of Exp.

Figure 10:
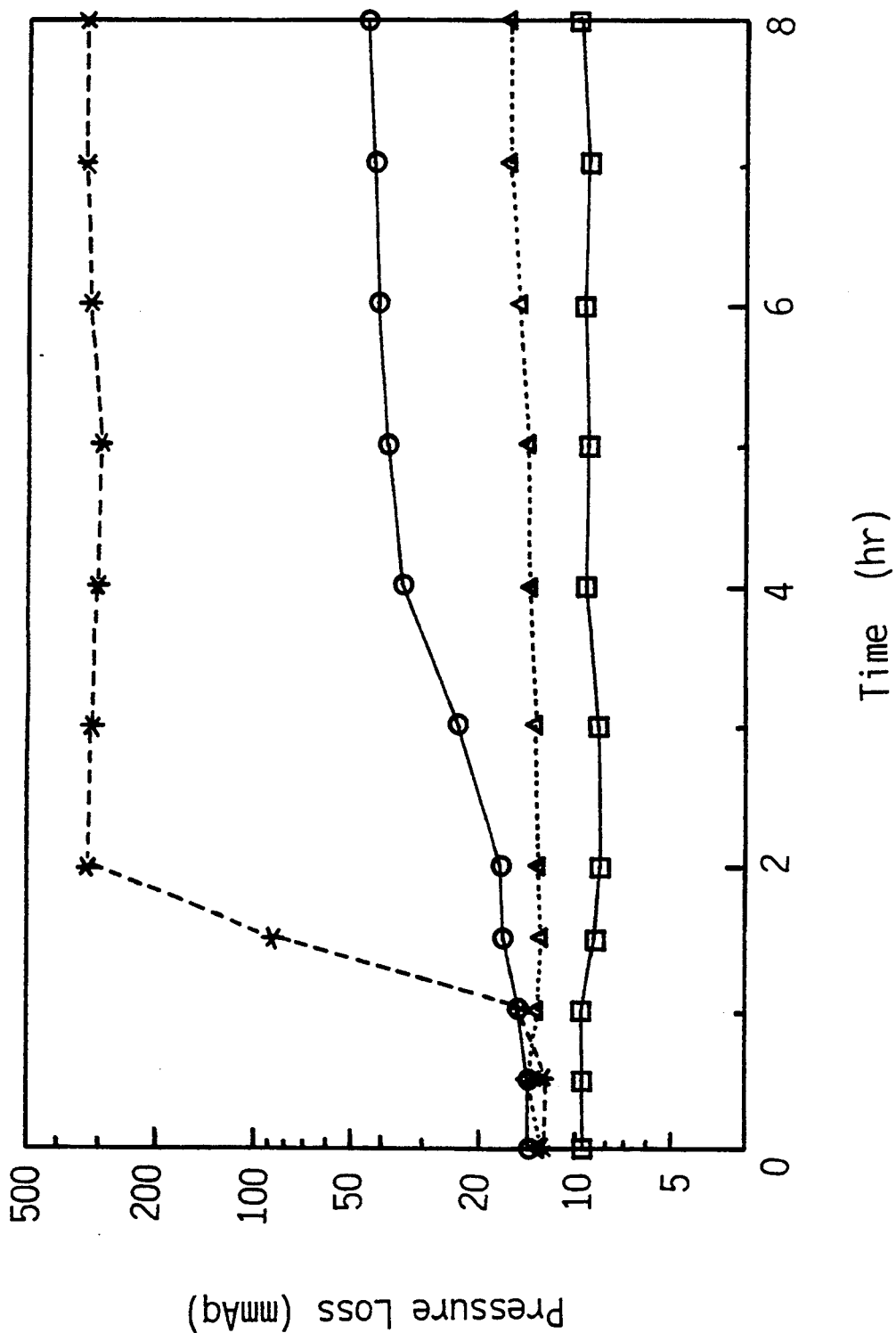
Figure 11:
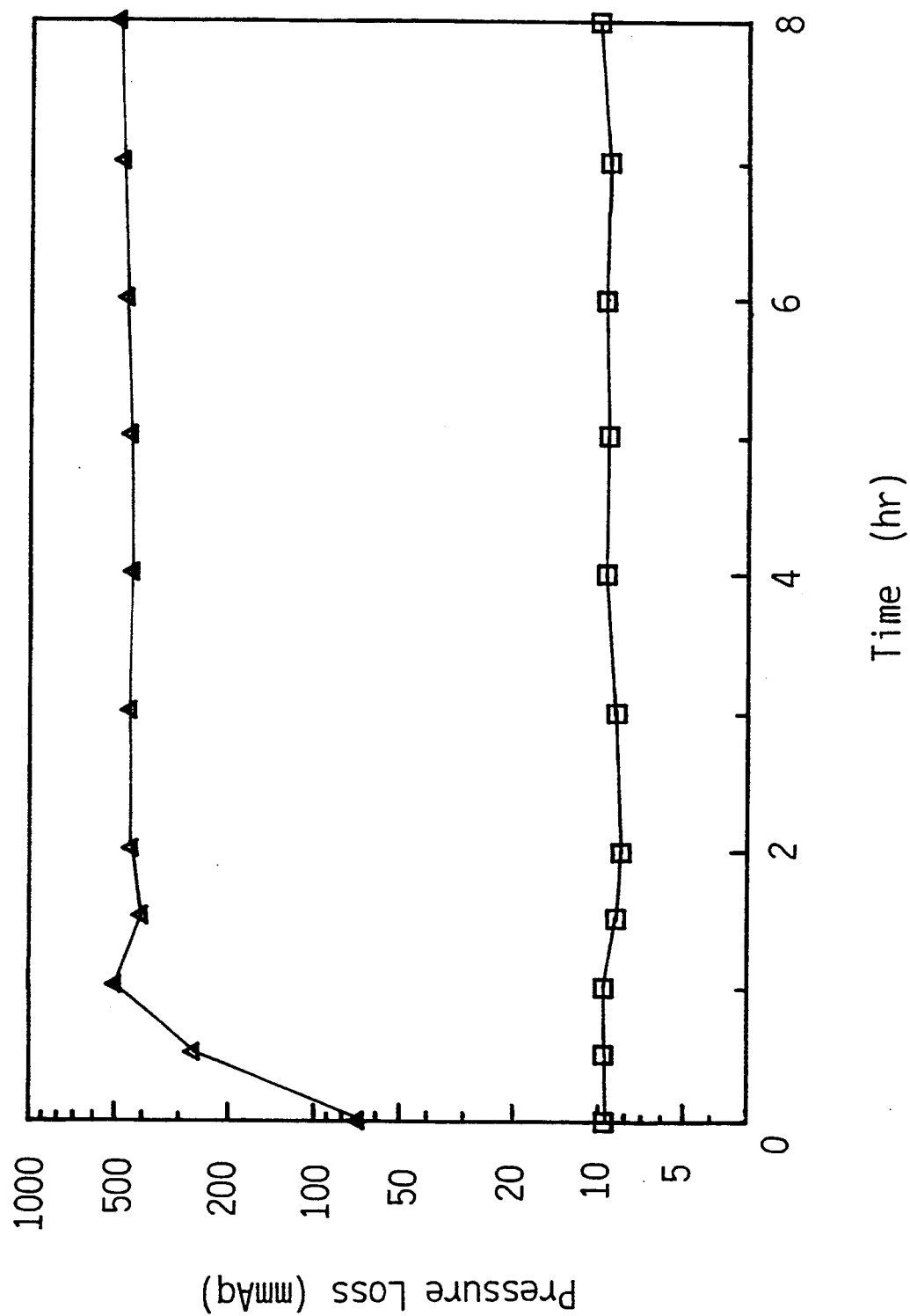
Figure 12:
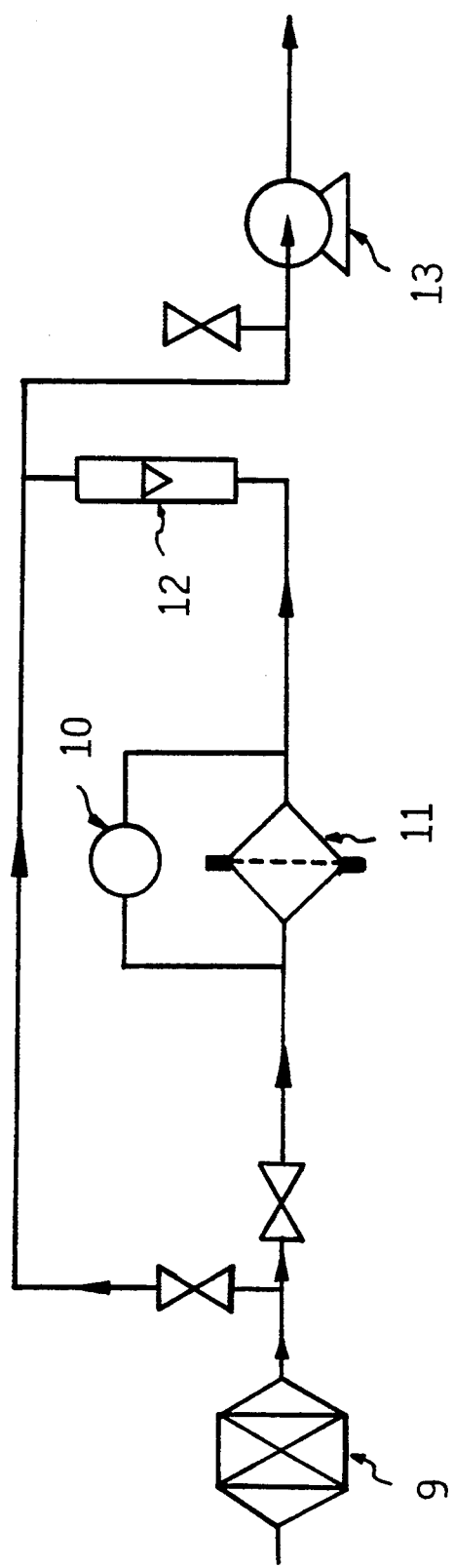

4, ☐ shows the results of the filter of Com. Exp. 4, and △ shows the results of the filter of Com. Exp. 5;

FIG. 10 shows the relationship between the elapsed time after ventilation and the pressure loss, wherein ○ shows the results of the filter of Exp. 1, ● shows the results of the filter of Exp. 5, □ shows the results of the filter of Com. Exp. 6, and * shows the results of the filter of Com. Exp. 7;

FIG. 11 shows the relationship between the elapsed time after ventilation and the pressure loss, wherein ○ shows the results of the filter of Exp. 1, and △ shows the results of the filter of Com. Exp. 8; and FIG. 12 is a flowchart showing how the pressure loss of the filter is measured, wherein 9 is an HEPA filter, 10 is a differential manometer, 11 is a sample holder, 12 is a flow meter, and 13 is an air blower.

DETAILED DESCRIPTION OF THE INVENTION

The layer of water-repellent fibers (A) [hereinafter also referred to as "water-repellent layer (A)"] is made of a water-repellent material such as polypropylene, polyester or Teflon (polyethylene fluoride), or it is made of a fiber having no water repellency such as glass, cotton, hemp, rayon or pulp which has been subjected to water-repellent finishing using, for instance, a fluorine water-repellent agent. Examples of the layer (A) are filter papers made of glass fibers which underwent water-repellent finishing or natural fibers, spun bonded non-woven fabrics made of polypropylene or polyester, meltblown non-woven fabrics, porous membranes made of Teflon, and the like.

The layer (A) is only required to have the same air permeability as that of general filters for air cleaning, which is from 1 to 300 $cm^3/cm^2 \cdot s$ according to JIS-L-1096.

The greater the water-repellency of the layer (A), the faster the deliquescent salt is absorbed by the layer (B) and the smaller the quantity of the salt water passing through the layer (A). Accordingly, it is preferable that the layer (A) have a water-repellency of from 70 to 100, more preferably from 80 to 100, especially preferably from 90 to 100, according to JIS-L-1092 "Testing Methods for Water Resistance of Clothes", 5.2 method.

The particle collection efficiency of the water-repellent layer (A) is not particularly limited, but in view of the size of sea salt particles in the air of coastal areas being generally from 0.5 to 10 $\mu m$, the particle collection efficiency of the layer (A) is preferably not less than 50% according to the particle collection efficiency testing method of JIS-B-9908 "Air filter units for Ventilation" form 2.

The thickness of the layer (A) is not particularly limited, but it is preferably from 0.1 to 2.0 mm, and more preferably from 0.2 to 1.0 mm.

Figure 1:
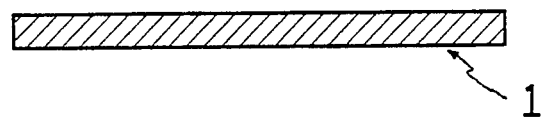
FIG. 1 shows a glass fiber filter which has hitherto been used, wherein 1 is a glass fiber.
Figure 2:
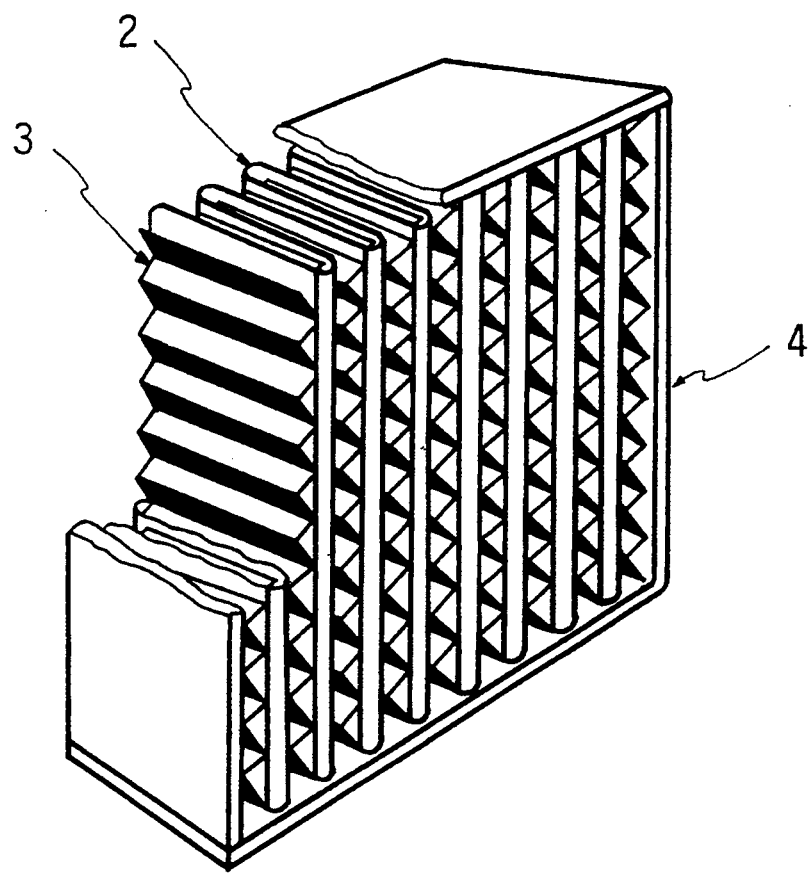
FIG. 2 shows a filter unit wherein the glass fiber filters as shown in FIG. 1, which have been folded, are housed in a frame, wherein 2 is a glass fiber filter, 3 is a separator, and 4 is a frame.
Figure 3:
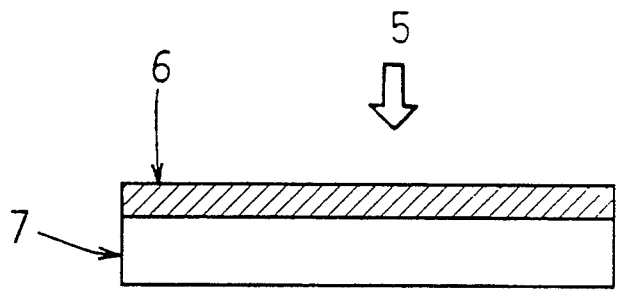
FIG. 3 shows a filter conventionally used, wherein a water-absorbent layer 7 is located downstream of a water-repellent layer 6, an arrow 5 showing the direction of the wind.
Figure 4:
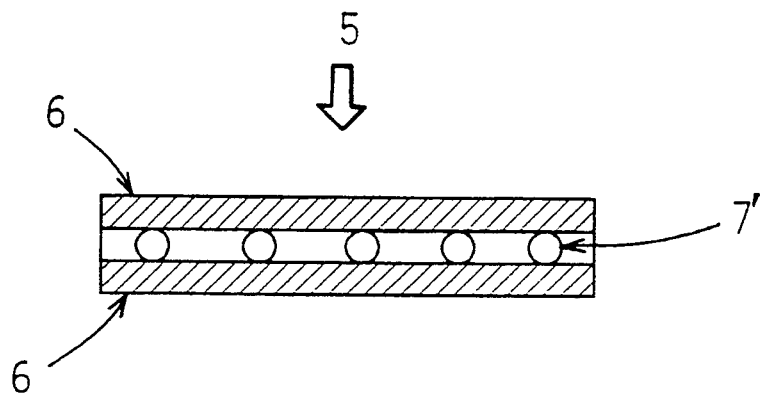
FIG. 4 shows a filter conventionally used, wherein a space holder 7' is located between two water-repellent filters 6.
Figure 5A:
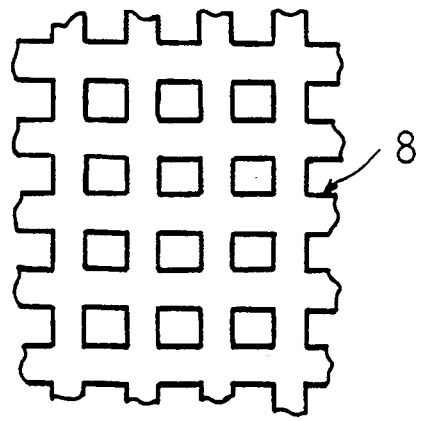
FIG. 5a (plan view) and FIG. 5b (cross section) show a spun lace exemplary of a material used for the water-absorbent layer (B) located upstream of the water-repellent layer (A), wherein 8 is a fiber bundle of water-absorbent fiber aggregates.
Figure 5B:
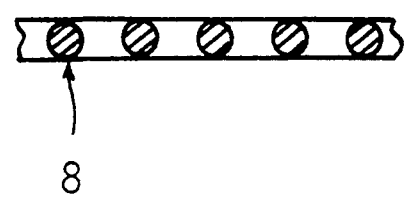
Figure 6A:
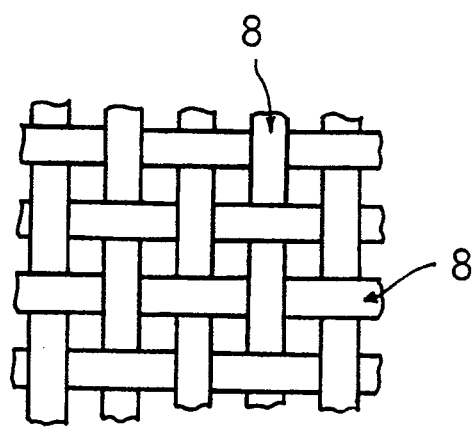
FIG. 6a (plan view) and FIG. 6b (cross section) show a gauzy fabric exemplary of a material used for the layer (B) located upstream of the layer (A), wherein 8 is a fiber bundle of water-absorbent fiber aggregates.
Figure 6B:
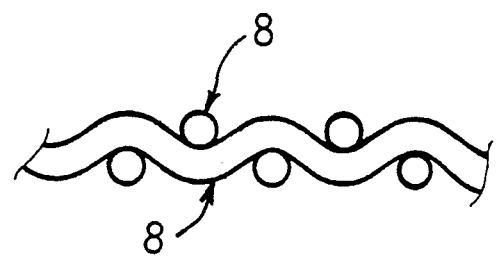
Figure 7A:
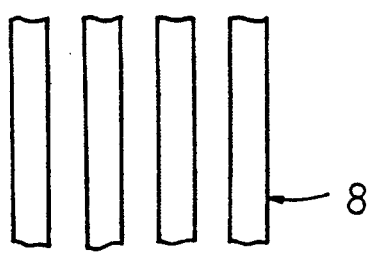
FIG. 7a (plan view) and FIG. 7b (cross section) show string fiber bundles composed of aggregates of water-absorbent fibers, which are exemplary of materials used for the layer (B) located upstream of the layer (A), wherein 8 is a fiber bundle of fiber aggregates.
Figure 7B:
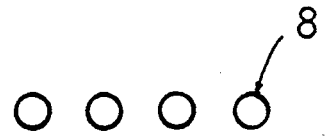

The layer (B) located upstream of the layer (A) is a layer wherein fiber bundles composed of aggregates of water-absorbent fibers are arranged [hereinafter also referred to as "water-absorbent layer (B)"]. Examples of the water-absorbent layer (B) are layers of mesh non-woven fabrics such as spun lace as shown in FIGS. 5a and 5b, layers of woven fabrics such as gauze as shown in FIGS. 6a and 6b, and the like. The layer (B) is not necessarily in the state of a sheet, and may be a layer of fiber bundles composed of string fiber aggregates being arrayed, as shown in FIGS. 7a and 7b.

The particle collection efficiency of the layer (B) is not particularly limited, but it is preferably lower than that of the water-repellent layer (A).

It is important that the layer (B) has an air-permeability of from 100 to 1000 $cm^3/cm^2 \cdot s$, and more preferably from 200 to 600 $cm^3/cm^2 \cdot s$, according to JIS-L-1096 "Testing Methods for Woven Fabrics" 6.27.1, A method. A water-absorbent layer (B) having an air permeability of less than 100 $cm^3/cm^2 \cdot s$, in other words, a layer wherein the fiber bundles are closely arranged to each other, also causes an increase in the pressure loss, for the reason that an area necessary for ventilation cannot be secured once deliquescent salt is absorbed by the fiber bundles composed of water-absorbent fiber aggregates, due to the closeness of the adjacent fiber bundles. A still smaller air permeability such as that not more than 50 $cm^3/cm^2 \cdot s$, in other words, the fiber bundles arranged still closer to each other, results in capillarity between the fiber bundles, whereby the absorbed deliquescent salt is retained well in the entirety of the water-absorbent layer (B), and the pressure loss is greatly increased.

While not limiting the water-absorbent fibers, the fiber bundles made of the fibers, and the layer (B), it is preferable that the layer (B) has a high water absorbency (salt water-absorbing rate) and a large water absorption (retention of salt water absorbed), so as to allow absorption of a large amount of salt water by the fiber bundles. The layer (B) has a water absorbency of preferably from 3 to 20 cm, more preferably from 5 to 20 cm, and especially from 10 to 20 cm, according to JIS-L-1096 "Testing Methods for Woven Fabrics" 6.26.1, B method. The layer (B) has a water absorption of preferably from 20 to 600%, and more preferably from 50 to 600%, according to JIS-L-1096 "Testing Methods for Woven Fabrics" 6.26.2 method.

The greater the weight of the layer (B), the larger the absolute amount of the retained salt water. Accordingly, the weight of the layer (B) is preferably not less than 30 $g/m^2$, and more preferably not less than 50 $g/m^2$.

In the layer (B), there are voids enclosed by fiber bundles, and the void is preferably from 0.1 to 10 $mm^2$ in size.

The thickness of the layer (B) is not particularly limited, but it is preferably from 0.3 to 5 mm, more preferably from 0.5 to 1 mm.

The filter of the present invention is characterized in that the filter comprises a water-repellent layer (A) and a water-absorbent layer (B) located upstream of the layer (A), that the layer (B) comprises voids enclosed by fiber bundles, and that the air permeability of the layer (B) is from 100 to 1000 $cm^3/cm^2 \cdot s$. Assuming when the salt water has passed through the water-repellent layer (A), another layer may be installed downstream of the layer (A), this being within the scope of the present invention. Setting other layers at the upstream of the layer (B) or downstream of the layer (A) for the purpose of removing relatively bulky dusts in the air or strengthening the filter, is also within the present invention.

The filter of the present invention is also useful in a case where airborne dust adheres to a filter and combines with water droplets to form sludge, causing an increase in the pressure loss.

Flying crystalline solid salt particles are collected by the water-absorbent layer (B) located upstream and the water-repellent layer (A) located downstream. The collected salt particles begin to deliquesce under high humidity conditions or together with airborne seawater particles. The deliquescent salt is quickly absorbed in or between the fibers of the fiber bundles of the layer (B). This absorption is the result of capillarity caused by a plurality of fibers arranged closely together and of the absorbency of the fiber itself.

Since the layer (A) located downstream has water repellency, the deliquescent salt which went through the layer (B) is repelled by the layer (A) and the salt water is mostly absorbed by the water-absorbent layer (B). Since the water-absorbent layer (B) has voids between the fiber bundles, the deliquescent salt does not remain between the fiber bundles, with the result that the passage for ventilation can be secured and the increase in the pressure loss can be minimized. In this way, the salt water does not pass through the water-repellent layer (A), and when the humidity of the outside air becomes low and it gets dry, the filter also becomes dry, and the deliquescent salt is crystallized and solidified again in the layer (B).

The filter of the present invention is advantageous in that the deliquescent salt seldom passes through the water-repellent layer (A) with the help of the mutual action of the water-repellent layer (A) and the water-absorbent layer (B), whereas deliquescing and drying of salt is repeated.

The air cleaning filter of the present invention is more specifically described by means of the following Examples. However, it is to be understood that the present invention is not limited to the following Examples.

EXAMPLE 1

Experiment 1

A spun lace non-woven fabric made of fiber aggregates of rayon and polyester (rayon: polyester = 70% by weight: 30% by weight), having a weight of 51 g/m$^2$, a thickness of 0.53 mm, an average void between fiber bundles of 1.7 mm$^2$, an air permeability of 310 cm$^3$/cm$^2$.s, a water absorbency of 12.5 cm, and a water absorption of 69% (upstream layer) was laminated on a meltblown non-woven fabric made of polypropylene, having a weight of 20 g/m$^2$, a thickness of 0.2 mm, an average fiber diameter of 4 μm, an air permeability of 60 cm$^3$/cm$^2$.s, and a water repellency of 90 (downstream layer) using a hot melt adhesive sheet to give a filter of Exp. 1.

Experiment 2

A spun lace non-woven fabric made of fiber aggregates of cellulose, having a weight of 65 g/m$^2$, a thickness of 0.60 mm, an average void between fiber bundles of 3.0 mm$^2$, an air permeability of 350 cm$^3$/cm$^2$.s, a water absorbency of 18 cm, and a water absorption of 110% (upstream layer) was laminated on the same meltblown non-woven fabric as used in Exp. 1 (downstream layer) using a hot melt adhesive sheet to give a filter of Exp. 2.

Experiment 3

Three sheets of gauze, each having a weight of 35 g/m$^2$, a thickness of 0.35 mm, an average void between fiber bundles of 0.4 mm$^2$, an air permeability of 820 cm$^3$/cm$^2$.s, a water absorbency of 11 cm, and a water absorption of 40% (upstream layer) were laminated on the same meltblown non-woven fabric as used in Exp. 1 (downstream layer) using hot melt adhesive sheets to give a filter of Exp. 3.

Experiment 4

A polyester spun bounded non-woven fabric impregnated with a resin, having a weight of 70 g/m$^2$ was laminated on the upstream layer of the filter of Exp. 1 using a hot melt adhesive sheet for reinforcing the filter, and used as a filter of Exp. 4.

Comparative Experiment 1

A filter made of commercially available glass fiber, having a weight of 70 g/m$^2$, a thickness of 0.6 mm, an average fiber diameter of 6.3 μm, an air permeability of 25 cm$^3$/cm$^2$.s, and a water repellency of 80 (a filter for AST-56-90 commercially available from NIPPON MUKI CO., LTD.) was used.

Comparative Experiment 2

A commercially available, salt damage-preventing filter of a polypropylene meltblown non-woven fabric, having a weight of 50 g/m$^2$, a thickness of 0.5 mm, an average fiber diameter of 5.3 μm, an air permeability of 25 cm$^3$/cm$^2$.s, and a water repellency of 90 (upstream layer), which has been laminated on a non-woven fabric impregnated with a resin, having a weight of 135 g/m$^2$, a thickness of 0.9 mm, an air permeability of 150 cm$^3$/cm$^2$.s, a water absorbency of 6.5 cm, and a water absorption of 130% (downstream layer) (a filter for VX-90-56F commercially available from JAPAN vilene COMPANY, LTD.) was used.

Comparative Experiment 3

A commercially available, salt damage-preventing filter of a glass fiber sheet, having a weight of 75 g/m$^2$, a thickness of 0.6 mm, an average fiber diameter of 6 μm, an air permeability of 80 cm$^2$/cm$^2$.s, and a water repellency of 90 (upstream layer), which has been laid on a glass fiber sheet, having a weight of 80 g/m$^2$, a thickness of 0.6 mm, an average fiber diameter of 6 μm, an air permeability of 23 cm$^3$/cm$^2$.s, and a water repellency of 90 (downstream layer) (a filter for CP-J-9ASR commercially available from CAMBRIDGE FILTER JAPAN, LTD.) was used.

In the Examples, the air permeability, the water repellency, the water absorbency and the water absorption were determined according to the following standards:

Permeability : JIS-L-1096 "Testing Methods for Woven Fabrics", 6. 27. 1, A method
Water-repellency : JIS-L-1092 "Testing Methods for Water Resistance of Clothes", 5. 2 method
Water-absorbency : JIS-L-1096 "Testing Methods for Woven Fabrics", 6. 26. 1, B method
Water-absorption : JIS-L-1096 "Testing Methods for Woven Fabrics", 6. 26. 2 method A sample having an effective ventilation area of 82 cm$^2$ (10.2 cm φ) was cut out from each of the filters of Exps. 1 to 4 and Com. Exps. 1 to 3. The samples were weighed when dry, and the weight was taken as an initial filter weight.

Then, NaCl particles which were previously dried and passed through a sieve of 400 mesh (opening = 37 μm) were adhered to the filter obtained above in an amount of about 1.5 g. The filter was weighed when dry, and the weight was taken as a weight of the NaCl-adhered filter.

A sample to which NaCl was adhered was set on a sample holder 11 in a testing device as shown in FIG. 12, which was installed in a test room adjusted to a temperature of 20° C. and a relative humidity of 90%, and the wind was blown toward the sample by an air blower 13 while adjusting the wind speed to 10 cm/second (air flow rate=2.94 m³/hour) by a flow meter 12. The pressure loss was measured by a differential manometer 10 every 30 minutes for the initial 2 hours of ventilation and every one hour for 6 hours since then. The air blown was made dust-free by HEPA filter 9.

The sample was taken out from the testing device at 8 hours from the start of the ventilation, dried and weighed. The weight was taken as a weight of the filter after scattering of NaCl.

The NaCl scattering percentage was calculated by the following equations:

NaCl adhesion amount=(weight of the NaCl-adhered filter)−(initial filter weight)

scattered NaCl amount=(weight of the NaCl-adhered filter)−(weight of the filter after scattering of NaCl)

NaCl scattering percentage=(scattered NaCl amount/NaCl adhesion amount)×100 (%)

The relationship between the elapsed time and the pressure loss is as shown in FIG. 8. From FIG. 8, it would be understood that when the wind began to pass through the filter of Com. Exp. 1, NaCl began to deliquesce and the pressure loss rose steeply, which caused damage of the filter per se before long; on the other hand, the filters of Exps. 1-3 showed only ignorable change of pressure loss. Further, it would be appreciated that the increase in the pressure loss was smaller than that of the conventional, salt damage-preventing filters of Comp. Exps. 2 and 3.

In Table 1, the NaCl scattering percentages at 8 hours from the start of the ventilation are shown. Table 1 indicates percentages of the filters of Exps. 1-4 which are far smaller than that of the filter of Com. Exp. 1, thus suggesting deliquescent NaCl-retaining performance of the filter, which would successfully avoid scattering of NaCl even under the high humidity conditions. In addition, it would be readily obvious that the NaCl scattering percentage of the filters of Exps. 1-4 is equal to or lower than that of the conventional filters of Comp. Exps. 2 and 3 which aimed at preventing salt damage.

EXAMPLE 2

Comparative Experiment 4

A non-woven fabric made of heat welding polypropylene/polyethylene fiber of 3 denier, having a weight of 80 g/m², a thickness of 0.7 mm, an air permeability of 160 cm³/cm².s, a water repellency of 0, a water absorbency of 3.0 cm, and a water absorption of 30% was laminated on the same meltblown nonwoven fabric as used in Exp. 1 to give a filter of Com. Exp. 4.

Comparative Experiment 5

A non-woven fabric made of a mixture of 40% by weight of water-absorbent acrylic fiber of 3 denier and 60% by weight of heat welding polypropylene/polyethylene fiber of 3 denier, having a weight of 80 g/m², a thickness of 0.8 mm, an air permeability of 210 cm³/cm².s, a water repellency of 50, a water absorbency of 2.1 cm, and a water absorption of 520% was laminated on the same meltblown non-woven fabric as used in Exp. 1 to give a filter of Com. Exp. 5.

With respect to the filters of Com. Exps. 4 and 5, the change of pressure loss at 20% under 90% RH and the NaCl scattering percentage after 8 hours from the start of the ventilation were determined and calculated in the same manner as in Example 1, and the results were compared with the results of Exps. 1-4. The change of the pressure loss is shown in FIG. 9, and the NaCl scattering percentage at 8 hours from the start of the ventilation is shown in Table 1.

From FIG. 9 and Table 1, it would be understood that the filters of Exps. 1-4 showed smaller increase in pressure loss and smaller NaCl scattering percentage than those of the filters of Com. Exps. 4 and 5. In other words, unless the layer (B) is a layer wherein fiber bundles of water-absorbent fiber aggregates are arranged and has a specific air permeability, a filter showing only small increase in pressure loss and small NaCl scattering percentage cannot be obtained by merely locating a water-absorbent layer upstream of a water-repellent layer.

Example 3

Experiment 5

A spun lace non-woven fabric which was the same as the upstream layer of Exp. 1 (upstream layer) was laminated on a glass fiber sheet which was the same as the downstream layer of Com. Exp. 3 (downstream layer) to give a filter of Exp. 5.

Comparative Experiment 6

A meltblown non-woven fabric which was the same as the downstream layer of Exp. 1 was soaked in an aqueous solution of a surfactant to make its water repellency 0. A spun lace non-woven fabric which was the same as the upstream layer of Exp. 1 (upstream layer) was laminated on the non-woven fabric obtained above (downstream layer) to give a filter of Com. Exp. 6.

Comparative Experiment 7

A glass fiber sheet which was the same as the downstream layer of Com. Exp. 3 was soaked in an aqueous solution of a surfactant to make its water repellency 0. A spun lace non-woven fabric which was the same as the upstream layer of Exp. 1 (upstream layer) was laminated on the glass fiber sheet obtained above (downstream layer) to give a filter of Com. Exp. 7.

The change of pressure loss at 20° C. under 90% RH and the NaCl scattering percentage after 8 hours from the start of the ventilation through the filters of Exp. 5 and Com. Exps. 6 and 7 were determined and calculated in the same manner as in Example 1, and the results of Com. Exps. 5 and 6 were compared with the results of Exps. 1 and 5. The change of pressure loss is shown in FIG. 10, and the NaCl scattering percentage after 8 hours from the start of the ventilation are shown in Table 1.

From FIG. 10 and Table 1, it would be evident that the filters of Exps. 1 and 5 showed a smaller increase in pressure loss and a smaller NaCl scattering percentage than those of the filters of Com. Exps. 6 and 7. In other words, it is important that the downstream layer has water repellency.

EXAMPLE 4

Comparative Example 8

A cotton woven fabric [114 single yarns of 50 count (the warp)×81 single yarns of 50 count (the woof) per square inch], having a weight of 110 g/m², a thickness of 0.25 mm, an air permeability of 15 cm³/cm².s, a water repellency of 0, a water absorbency of 4.0 cm, and a water absorption of 38% (upstream layer) was laminated on a meltblown non-woven fabric which was the same as the downstream layer of Exp. 1, to give filter of Com. Exp. 8.

The change of pressure loss at 20° C. under 90% RH and the NaCl scattering percentage after 8 hours from the start of the ventilation through the filter of Com. Exp. 8 were determined and calculated in the same manner as in Example 1, and the results were compared with the results of Exp. 1. The change of pressure loss is shown in FIG. 11, and the NaCl scattering percentage after 8 hours from the start of the ventilation is shown in Table 1.

From FIG. 11 and Table 1, it would be understood that the filter of Exp. 1 showed a smaller increase in pressure loss and a smaller NaCl scattering percentage than those of the filter of Com. Exp. 8. In other words, increase of the pressure loss and NaCl scattering percentage could be made lower when a water-absorbent layer is located upstream of a water-repellent downstream layer and the upstream layer has a high air permeability, according to JIS-L-1096 "Testing Methods for Woven Fabrics", 6. 27. 1, A method.

TABLE 1

|  | NaCl scatter percentage |
| --- | --- |
| Exp. 1 | 1.6% |
| Exp. 2 | 0.7% |
| Exp. 3 | 2.7% |
| Exp. 4 | 1.7% |
| Exp. 5 | 1.3% |
| Com. Exp. 1 | 92.7% |
| Com. Exp. 2 | 3.5% |
| Com. Exp. 3 | 17.4% |
| Com. Exp. 4 | 84.6% |
| Com. Exp. 5 | 76.6% |
| Com. Exp. 6 | 58.4% |
| Com. Exp. 7 | 17.7% |
| Com. Exp. 8 | 56.9% |

The air cleaning filter of the present invention which is composed of a layer (B) with fiber bundles of water-absorbent fiber aggregates being arranged therein and a water-repellent layer (A) wherein the layer (B) is located upstream of the layer (A), shows only a slight increase in the pressure loss and allows only a small scattered amount of the deliquescent salt, even if the salt particles collected by the filter deliquesce under high humidity or with airborne sea water particles.

Further, by affording the water-absorbent layer (B) an air permeability of not less than 100 cm³/cm². s, a further reduction in the increase in the pressure loss can be made and therefore the passage of the deliquescent salt can be lessened.

What we claim is:

1. An air cleaning filter comprising:
   a layer (A) of water-repellent fiber and
   a layer (B) in which fiber bundles comprising aggregates of water-absorbent fibers are arranged, said layer (B) having an air permeability of not less than 100 cm³/cm² . s and said layer (B) being located upstream of said layer (A).

2. The filter of claim 1, wherein said layer (B) weighs not less than 30 g/m².

3. The filter of claim 2, wherein said layer (B) weighs not less than 50 g/m².

4. The filter of claim 1, wherein said layer (B) has a water absorbency of not less than 3 cm.

5. The filter of claim 4, wherein said layer (B) has a water absorbency of not less than 5 cm.

6. The filter of claim 1, wherein said layer (B) has a water absorption of not less than 20%.

7. The filter of claim 6, wherein said layer (B) has a water absorption of not less than 50%.

8. The filter of claim 1, wherein said layer (B) has voids of 0.1 to 10 mm² in size between the fiber bundles.

9. The filter of claim 1, wherein said layer (A) has a water repellency of not less than 70.

10. The filter of claim 9, wherein said layer (A) has a water repellency of not less than 80.

* * * * *